United States Patent

Zeeb

[15] 3,653,287
[45] Apr. 4, 1972

[54] (LATHE ATTACHMENT) APPARATUS FOR ADJUSTING THE CENTER OF A TURNING MACHINE

[72] Inventor: Rhinhold J. Zeeb, Lesterville, S. Dak. 57040

[22] Filed: Nov. 10, 1969

[21] Appl. No.: 875,344

[52] U.S. Cl. .............................................................82/33 A
[51] Int. Cl. ........................................................B23b 23/02
[58] Field of Search .....................................................82/33 A

[56] References Cited

UNITED STATES PATENTS

| 809,353 | 1/1906 | Zange | 82/33 A |
| 2,378,811 | 6/1945 | Vinner | 82/33 A |
| 2,390,627 | 12/1945 | Truba et al. | 82/33 A X |

*Primary Examiner*—Leonidas Vlachos
*Attorney*—Cifelli, Behr & Rhodes

[57] ABSTRACT

An apparatus for adjusting the supporting center for the workpiece in a turning machine to facilitate the cutting of tapers on the workpiece. The apparatus fits into the normal housing for the supporting center of a turning machine and has an elongated body extending at a substantial angle from the support center housing. An adjustable center is slidably mounted on the elongated body and can be positioned anywhere along the length of the elongated body within predetermined limits by rotating an adjusting device. The adjustable center is then locked in position to fix the degree of taper of the workpiece and to provide the required support.

3 Claims, 4 Drawing Figures

PATENTED APR 4 1972 3,653,287
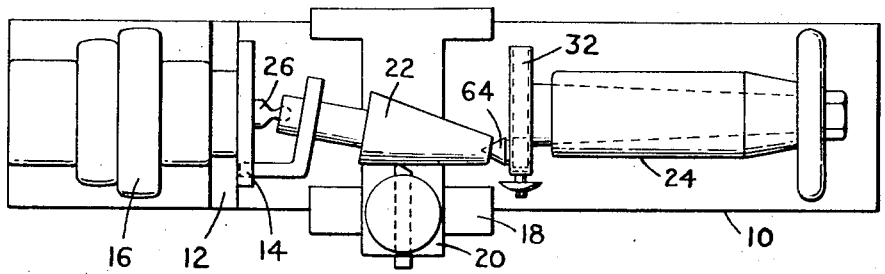
FIG. 1
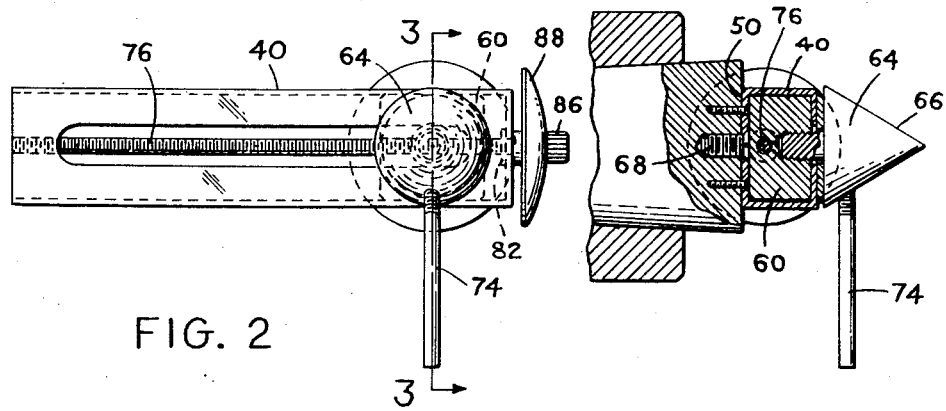
FIG. 2
FIG. 3
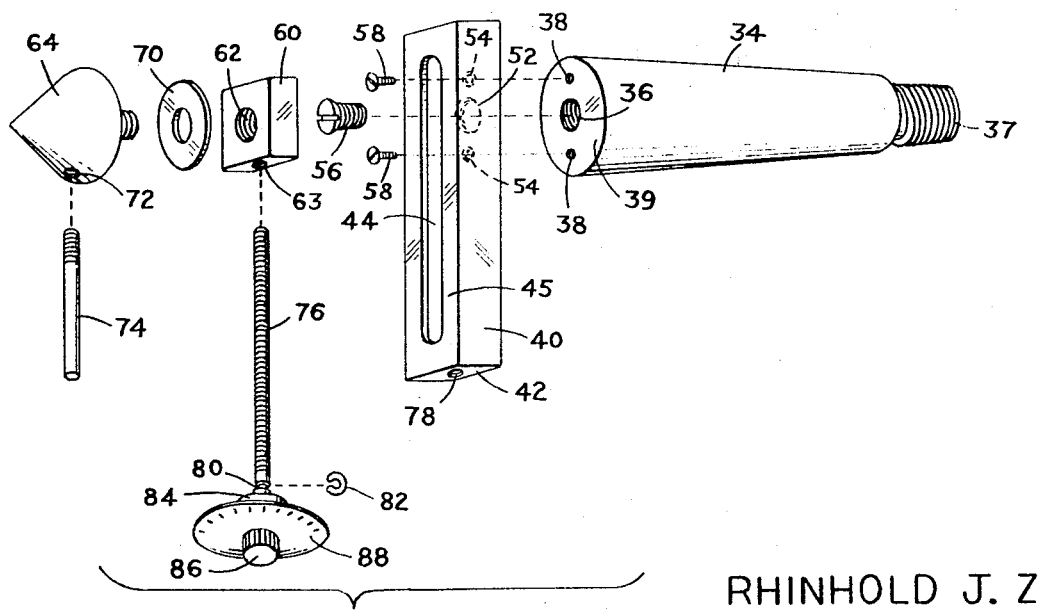
FIG. 4
RHINHOLD J. ZEEB
INVENTOR.
BY Richards & Cifelli

(LATHE ATTACHMENT) APPARATUS FOR ADJUSTING THE CENTER OF A TURNING MACHINE

BACKGROUND OF THE INVENTION

Lathes and other turning machines must usually be able to produce tapers on workpieces. The more common devices used to provide the taper producing capability for turning machines usually move the cutting tool of the machine at a prescribed angle to the axis of rotation of the workpiece as the cutting tool progressed along the workpiece. Such taper attachments are well known in the art, and are fairly complex and expensive.

Attempts have been made to simplify the taper cutting equipment by developing apparatus which offset the support center of the turning machine and, therefore, offset the axis of rotation of the workpiece with relation to the normal path of the cutting tool, so that the normal tool carriage could be used without any special attachments to cut tapers. An example of such a device is shown in U.S. Pat. No. 2,944,454, issued July 12, 1960, to H. J. Vasselli for a Centering Device for Lathes and the Like. As can be seen from this patent, however, these devices are often so cumbersome, complex and expensive that they offer little advantage to the average machinest over the standard and well known taper attachments mentioned above.

Another example of an apparatus to offset the axis of the working piece is shown in U.S. Pat. No. 1,226,825, issued May 22, 1917, to H. D. Stewart for Taper Cutting Attachment for Lathes. This apparatus, however, was also unnecessarily complex requiring an excessive number of parts and adjustments for its proper operation.

SUMMARY OF THE INVENTION

The present invention provides a simple and effective apparatus for providing tapering capabilities for a lathe or other type of turning machine by offsetting the support center of the workpiece with relation to the path of travel of the tool. The apparatus consists of a shaft member which is mounted in the housing where the standard center for supporting the working piece is usually mounted. A crosswise elongated member is connected to the shaft member and an adjustable center is slidably positioned on the crosswise member. The adjustable center can be accurately positioned at any predetermined point along the crosswise member by rotating a positioning means which is mounted on the transverse member. A locking device is provided which allows the adjustable center to be locked in any position along the transverse member.

Accordingly, it is an object of the present invention to provide an adjustable center for a turning machine which can be used to offset the axis of rotation of the workpiece from the path of travel of the cutting tool.

It is a further object of the present invention to furnish a simple and reliable taper making attachment for turning machines.

Yet another object of the present invention is to provide a taper making attachment for turning machines which can be accurately adjusted to provide a predetermined taper.

Still another object of the present invention is to provide an apparatus for adjusting the center of the turning machine which has a minimum of parts and can be cheaply and easily manufactured.

Yet another object of the present invention is to provide an apparatus for adjusting the center of the turning machine which can be easily and conveniently locked in place after the center has been accurately adjusted.

Other objects and advantages will be apparent from the following description of an embodiment of the invention, and the novel features will be particularly pointed out hereinafter in connection with the appended claims.

BRIEF DESCRIPTION OF THE DRAWINGS

FIG. 1 is a top view of a lathe incorporating an apparatus for adjusting the center built in accordance with the teachings of the invention.

FIG. 2 is a front view of an apparatus for adjusting the center of the turning machine built in accordance with the teachings of the invention.

FIG. 3 is a view partially in section taken along lines 33 of FIG. 2.

FIG. 4 is an exploded view of an apparatus for adjusting the center of a turning machine built in accordance with the teachings of the invention.

DESCRIPTION OF THE PREFERRED EMBODIMENT

FIG. 1 shows a standard lathe 10 with a headstock 12 on which is mounted a face plate 14 which is driven by a multi-speed pulley 16. The lathe has a standard tool carriage 18 and a standard cutting tool assembly 20. A workpiece 22 is mounted between the tail stock 24 of the lathe and the face plate 14 by being attached to two centers, a head center 26 extending from the face plate and a tail center 64 extending from and connected to a center adjusting apparatus 32.

As shown in FIGS. 2, 3, and 4, the apparatus for adjusting the center of the rotating machine comprises a body shaft 34 with a threaded axial passage 36, and two smaller threaded aligning passages 38 disposed on the flattened end 39 of the shaft. The end of the body shaft 37 remote from the passages is adapted to fit into the tail stock of the lathe in the normal conventional manner.

A slide housing 40 is formed from a rectangular tubular section and has a closed bottom 42. A channel 44 is machined into the front face 45 of the slide housing opposite from end 39 of the body shaft 34. The rear face 50 of the slide housing has a large hole 52 and two smaller holes 54 corresponding to the axial passage 36 and the aligning passages 38 respectively on end 39 of the body shaft. A large fastening screw 56 and two smaller aligning screws 58 pass through the correspondingly named holes in rear face 50 of the housing and threadably engage the corresponding passages in the body shaft 34 to firmly secure the slide housing 40 to the end 39 of the body shaft.

As can be seen from FIG. 3, the large hole 52 and smaller holes 54 in the rear face 50 of the slide housing 40 are countersunk so that the fastening screw 56 and aligning screws 58 will fit flush within the housing.

A slide member 60 is located within the slide housing 40 with a clearance between it and the inner walls of the housing to allow it to slide freely within the housing. The slide member 60 has a large threaded passage 62 which is disposed with its axis normal to the longer dimension of the slide housing. A smaller threaded passage 63 is machined through the slide member 60 with the axis of the smaller passage being parallel to the longer dimension of the slide housing.

An adjustable center 64 having a conical nose section 66 and a threaded extension 68 is mounted through the slide housing by having the threaded extension pass through the channel 44 on the front face 45 of the slide housing and engage the large threaded passage 62 in the slide member 60. A washer 70 is disposed between the back face of the conical nose section and the front face 45 of the slide housing.

A transverse passage 72 is located in the conical nose section 66 of the center. A tightening rod 74 is adapted to fit into the transverse passage. Though the tightening rod 74 and the transverse passage 72 are shown as being threaded so that they would mutually engage each other, this need not be the case. Both the transverse passage and the tightening rod can be unthreaded.

When the tightening rod is inserted into the transverse passage the adjustable center 64 can be turned so that the threaded extension 68 advances into the large threaded passage 62 of the slide member. As the threaded extension is rotated, the slide member 60 will be drawn toward the front face 45 of the slide housing 40 until the forces drawing the slide member toward the conical nose section 66 are strong enough to lock these pieces against the front face 45 of the slide housing.

The slide member 60 is positioned within the slide housing 40 by means of a threaded shaft 76 which threadably engages the smaller threaded passage 63 of the slide member. The threaded shaft extends through an opening 78 in the bottom wall 42 of the slide housing. A small groove 80 is machined in the threaded shaft and a C-clip 82 is seated in the groove and co-acts with the bottom of the housing 42 to prevent the shaft from falling out. A spacing knob 84 is fixed on the end of the threaded shaft 76 and it co-acts with the C-clip and the closed bottom 42 of the slide housing to fix the relationship of the threaded shaft to the slide housing, while allowing the threaded shaft to rotate. A knurled knob 86 and a callibrated dial 88 are also positioned on the very end of the threaded shaft to enable the shaft to be rotated in any desired manner to position the slide member 60 within the slide housing.

OPERATION OF DEVICE

The apparatus for adjusting the center of the rotating machine is easily installed and operated in a standard turning machine. The assembled apparatus is inserted into the standard tail stock 24 of the lathe, and secured in the usual manner. The tightening rod is used to back off the conical nose section 66 from the slide member 60 so that the slide member will be able to freely move within the slide housing 40. The knurled knob 86 is rotated until the slide member has been moved to the proper position within the slide housing, thereby moving the center 64 along with it. After the proper position has been obtained, the tightened rod 74 is inserted in the transverse passage 72 of the adjustable center 64 and the threaded extension 68 of the center is threaded into the large threaded passage 62 of slide member 60, thereby narrowing the space between the conical nose section 66 and the slide member 60 until the two members are locked in place against the front face 45 of the slide housing 40.

The workpiece can then be mounted between the head center 26 and the adjustable center 64 so that upon rotation of the workpiece and normal advancement of the cutting tool along the guideways of the lathe, a taper will be cut in the workpiece.

Although the adjustable center 64 of the invention was described as being a non-rotating or "dead" center, it should be obvious to one skilled in the art that this center could also be made as a rotating or "live" center in which the conical nose section 66 would rotate while the threaded extension 68 would still be stationary.

It should also be pointed out that although the embodiment has been described using aligning screws 58 to engage aligning passages 38 in the body shaft, that alignment between the slide housing and the body shaft could be provided by means of dimples on the rear face 50 of the slide housing and corresponding depressions on the end face 39 of the body shaft 34.

It will be understood that various changes in the details and materials and arrangements of the parts which have been herein described have been illustrated in order to explain the nature of the invention may be made by those skilled in the art within the principle and scope and information as expressed in the appended claims.

What is claimed is:

1. In a matching device adapted to rotate a workpiece and support at least one end of the workpiece by a center mounted in a support center housing while cutting the workpiece with a stationary tool, an apparatus for adjusting the support center comprising:
   a. a support shaft adapted to be mounted in said support center housing;
   b. an elongated rectangular tubular slide housing closed at one end and having a channel therein running along the longer dimension of the slide housing, said closed end having a passage formed therein;
   c. means connected said slide housing to said shaft with the longer dimension of the slide housing at a substantial angle to the axis of said shaft;
   d. said channel in said slide housing and said connecting means connecting said housing to said shaft being disposed on opposite faces of said rectangular tubular slide housing;
   e. a slide member having a threaded bore formed therein and also having a second threaded passage formed therein;
   f. an adjustable center slidably mounted on said slide housing, and said adjustable center having a threaded shaft extending therefrom and adapted to extend through said channel in said slide housing to threadably engage said threaded bore in said slide member; and
   g. positioning means including a threaded rod extending through said second threaded passage in said slide member and said passage in said closed end of said slide housing, and said positioning means to position said slide member with relation to said slide housing by rotation of said threaded rod;
   h. means to secure said threaded rod to said slide member and said housing so that upon rotation of said threaded rod, said slide member will move with respect to said slide housing; and said securing means including a spacing means near the end of said threaded rod extending from the closed end of said slide housing, a C-clip groove in said threaded rod, said groove disposed adjacent the closed end and within said slide housing, and a C-clip mounted on said C-clip groove to coact with the closed end of said slide housing and said spacing means to fix the position of said threaded rod with relation to said slide housing while allowing rotation of said threaded rod;
   i. locking means to fix said adjustable center with relation to said slide housing including threaded means coacting with said adjustable center and said slide member constructed and arranged so that actuation of said threaded means will force said slide member against said slide housing to lock said slide member and said adjustable center in position.

2. In a matching device adapted to rotate a workpiece and support at lest one end of the workpiece by a center mounted in a support center housing while cutting the workpiece with a stationary tool, an apparatus for adjusting the support center comprising:
   a. a support shaft adapted to be mounted in said support center housing;
   b. an elongated rectangular tubular slide housing closed at one end having a channel therein running along the longer dimension of the slide housing;
   c. means connecting said slide housing to said shaft with the longer dimension of the slide housing at a substantial angle to the axis of said shaft, said connecting means including a threaded axial passage in the end of said support shaft extending from said center housing; a screw passage in the face of said slide housing adjacent the end of said shaft having the axial threaded passage; screw means extending from said slide housing through said screw passage and threadably engaging said axial passage in said support shaft to fix said slide housing to said support shaft upon tightening of said screw means;
   d. said channel in said slide housing and said connecting means connecting said housing to said shaft being disposed on opposite faces of said rectangular tubular slide housing;
   e. a slide member;
   f. an adjustable center slidably mounted on said elongated slide housing, and connected through said channel in said slide housing to said slide member;
   g. positioning means connected to said slide housing and said slide member to position said slide member with relation to said slide housing by rotation of said positioning means;
   h. locking means to fix said adjustable center with relation to said slide housing including threaded means coacting with said adjustable center and said slide member constructed and arranged so that actuation of said threaded means will force said slide member against said slide housing to lock said slide member and said adjustable center in position.

3. The combination claimed in claim no. 2 wherein said means connecting said slide housing to said support shaft further comprise:
   a. at least one aligning passage disposed in the end of said shaft with said threaded axial passage, said aligning passage radially displaced from said axial passage; and
   b. at least one aligning protrusion extending from the face of said slide housing, said aligning protrusion correspondingly disposed to the aligning passage in said shaft, to mate with said aligning passage upon proper positioning of said slide housing with said shaft.

* * * * *